United States Patent [19]
Conrad

[11] 3,859,865
[45] Jan. 14, 1975

[54] POSITIVE CENTERING ROLLERS OR PULLEYS FOR WOVEN WIRE BELTING CONVEYERS

[76] Inventor: Rene Conrad, 700 Catamaran, San Mateo, Calif. 94404

[22] Filed: Apr. 30, 1973

[21] Appl. No.: 355,867

[52] U.S. Cl. .................. 74/241, 74/230.5, 198/202
[51] Int. Cl. .......................... F16h 7/18, F16h 55/36
[58] Field of Search .......... 74/241, 240, 239, 230.6, 74/230.5; 198/202, 192, 194, 193

[56] References Cited
UNITED STATES PATENTS

| | | | |
|---|---|---|---|
| 1,980,777 | 11/1934 | Zollinger | 198/192 R |
| 2,575,598 | 11/1951 | Shank | 198/192 R |
| 2,592,581 | 4/1952 | Lorig | 74/241 |
| 2,743,810 | 5/1956 | Armstrong | 198/192 R |
| 3,661,246 | 5/1972 | Faunce | 198/202 |
| 3,713,348 | 1/1973 | Conrad et al. | 74/240 |
| 3,744,329 | 7/1973 | Frank | 74/241 |

Primary Examiner—Samuel Scott
Assistant Examiner—Allan R. Burke
Attorney, Agent, or Firm—Schatzel & Hamrick

[57] ABSTRACT

Spiralled ribbing on rollers of a woven wire conveyer belt coordinated with the pitch weave in the flattened coil links of the belting for preventing sidewise slippage and for maintaining such belting centered on such rollers; The introduction of a wave form and/or a projection between recesses in such spiralled ribbing coordinated with the open voids between alternate coils of the belting links for enhancing traction as well as maintaining centered alignment of such belting on the rollers; The provision of spike toothed pins at widthwise center of such rollers spaced circumferentially for entry into the open voids in the belt links along centerline of the belting; and the mounting of such pins on a ring freely rotatable within a companion groove formed at withwise center of such rollers to afford self adjustment of the pins relative to the voids in the belt links at belt center as the belt trains about such pulley.

15 Claims, 11 Drawing Figures

PATENTED JAN 14 1975
3,859,865
SHEET 1 OF 2
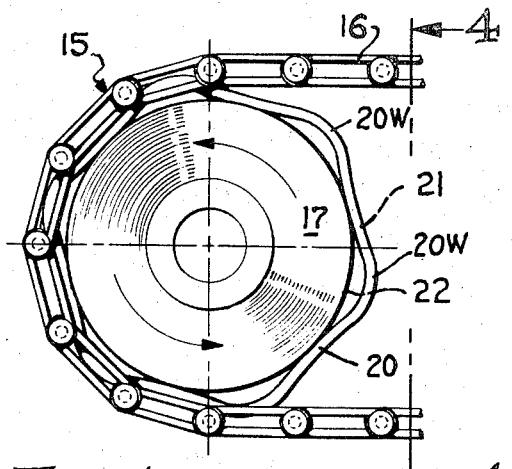
Fig.1.
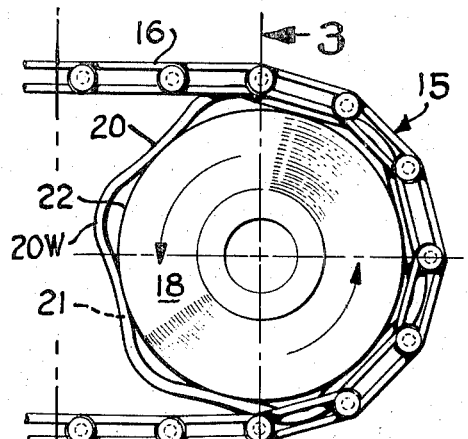
Fig.2.
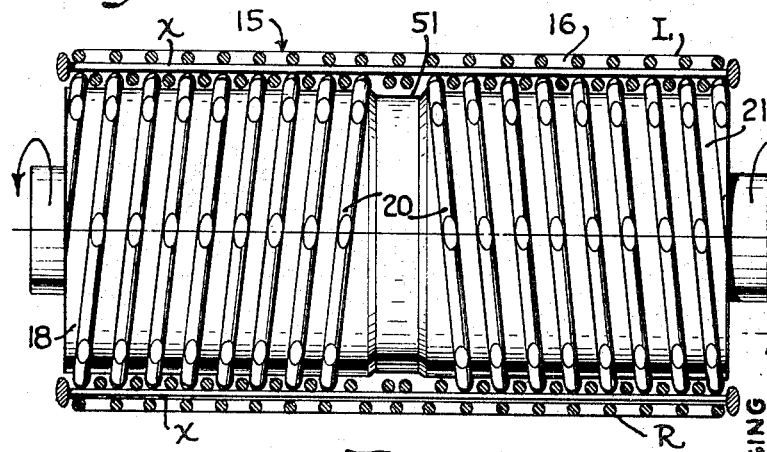
Fig.3.
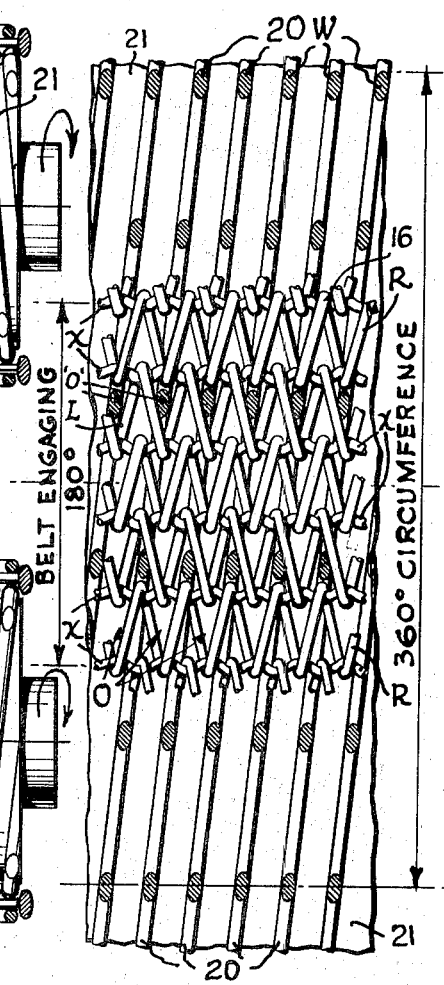
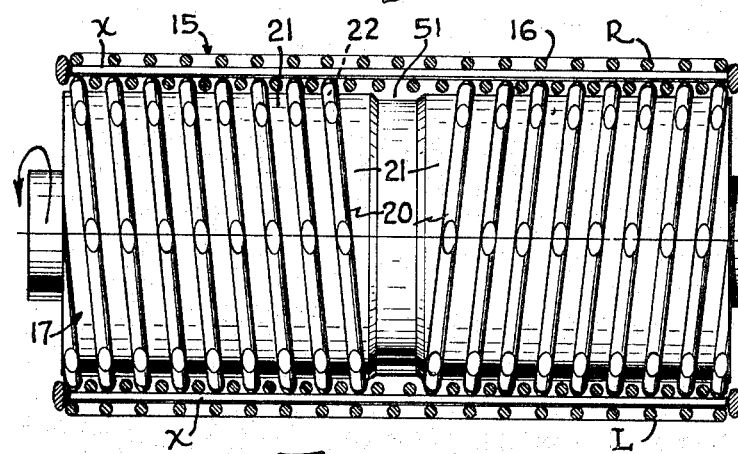
Fig.4.
Fig.5.

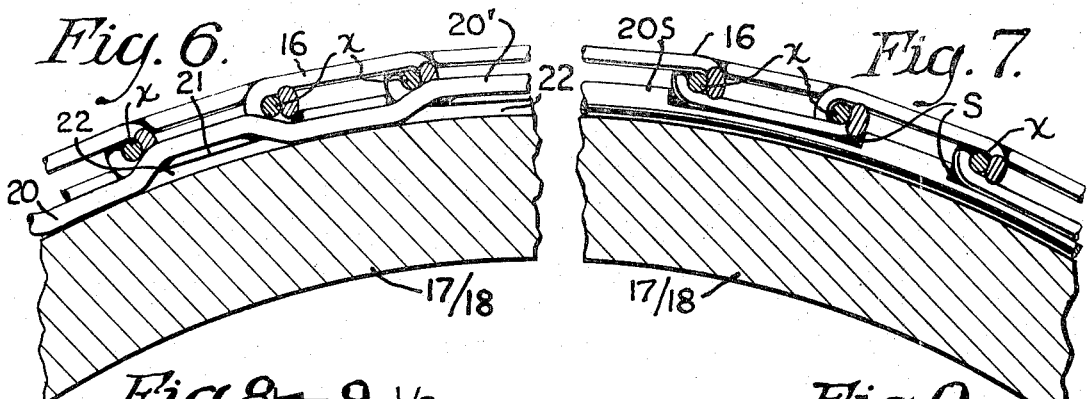
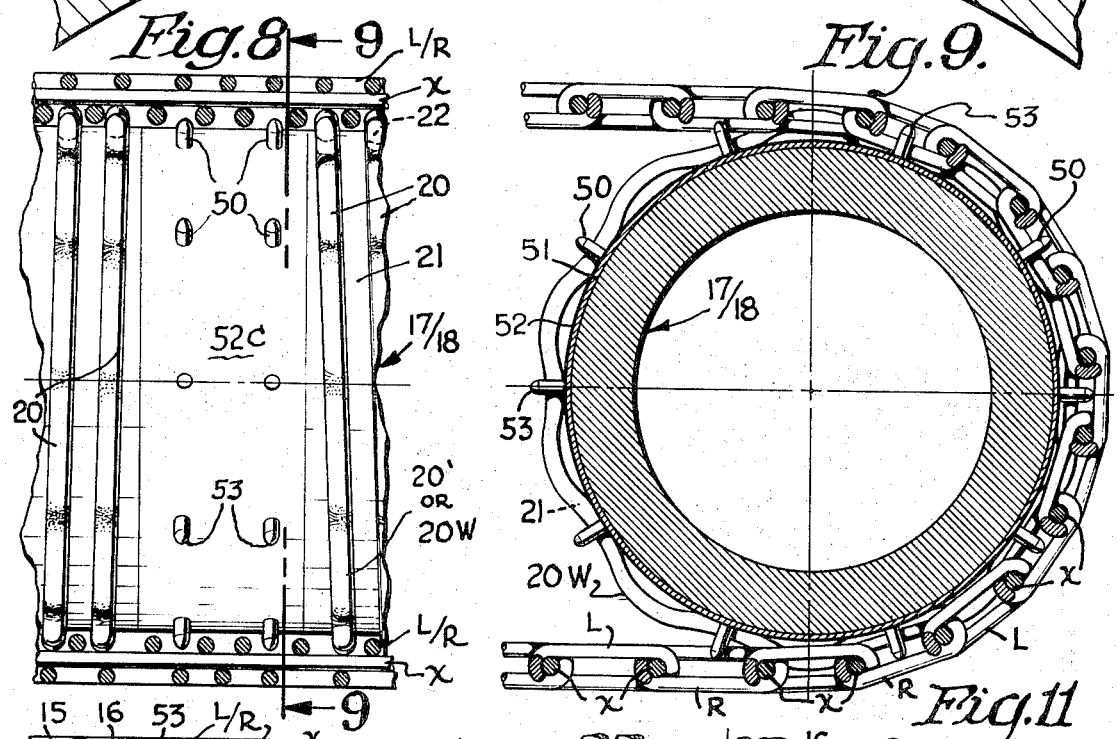
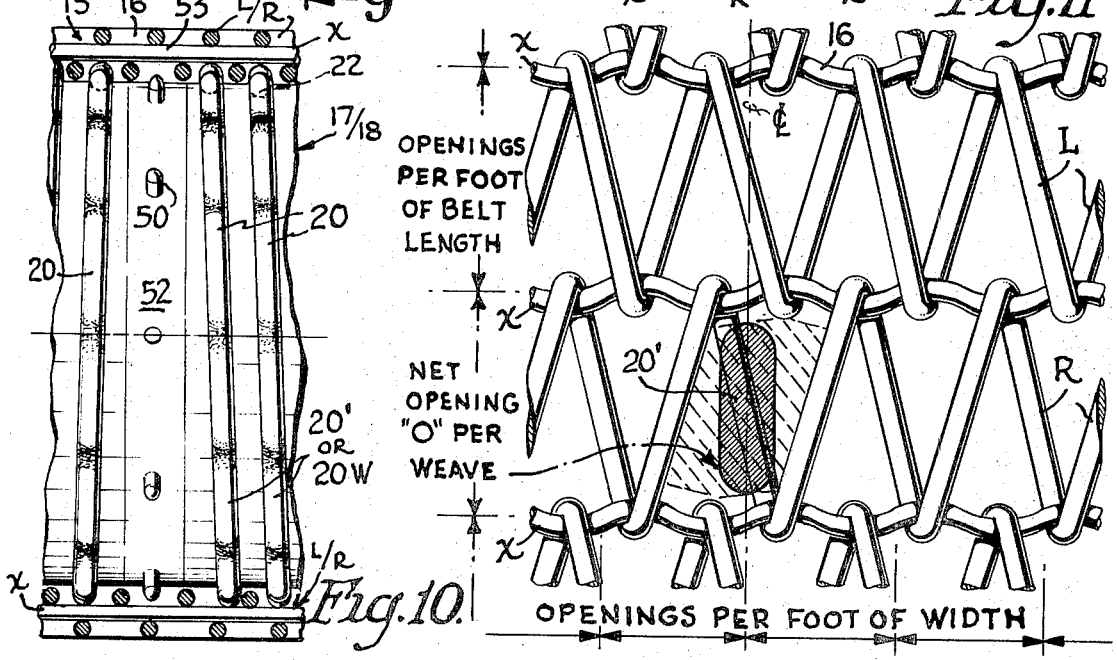

POSITIVE CENTERING ROLLERS OR PULLEYS FOR WOVEN WIRE BELTING CONVEYERS

BACKGROUND

This invention relates to a pulley and/or roller arrangement for woven wire belting.

Heretofore only straight-faced pulleys were used for woven wire belting, as it was considered that crowned pulleys would deform mesh belts. Drive pulleys had to be as large as possible, and lagging material was applied to them to increase traction. Moreover, conveyer design had to provide for support across the full belt width, either stationary or roller type. The most desirable means was idler rollers which would minimize friction and afford adjustability to control belt creep.

As is well known, belts should never operate under more tension than required to carry the load. Tension should be uniform because uneven tension can distort the weave and shorten belt life. Similarly, uneven loading can result in uneven tension with consequent harmful effects. Belt return should be as slack as construction permits to facilitate control of belt travel. Takeups to provide adequate slackside tension are usually provided.

It is a known fact that wire mesh belts will creep toward the "short side" of a conveyer. The basic principle of adjustment is then to increase deflection or tension on the side to which the belt creeps, or to decrease deflection or tension on the opposite side. An increase in tension applies only to terminal pulleys, and is usually undesirable as it can distort the belt. The preferred method is to horizontally adjust the deflection of snub or support rollers.

The first step in aligning the belt is to see that terminal pulleys are parallel with each other and at right angles to centerline of the belt. This is accomplished by the "equal diagonals" method. Then all intermediate rollers and supports are aligned as precisely as possible. Then the belt is ready for a test run.

Virtually all wire conveyor belts call for a slack return. It is this return that can most easily be controlled to adjust side travel. Horizontal adjustment of the return idler rollers had been the most effective, and was recommended where possible. This adjustment of the return components controls side travel without increasing tension on either side of the belt.

STATEMENT OF THE INVENTION

It is an object of this invention to provide means on the drive, idler and terminal rollers for a wire belt conveyer for positively centering wire belting relative to such rollers.

It is another object of this invention to provide the rollers with projections which engage the voids between links which make up wire belting.

It is yet another object to provide the rolllers with spirally tending ridges or beads either inwardly or outwardly tending from center depending on the position of such roller in the closed loop system of belting. The spiralled ridges on drive pulleys or rollers tending outwardly from center while those on terminal or return rollers tend inwardly from ends towards center. In accordance with the present invention, although straight-faced rollers are used as is customary for wire belting, a slight crown effect may be found beneficial without harmful deformation of the mesh of the belting. This slight crown effect is achieved by setting the spiralled ribbing in shallow grooves adjacent midwidth center of the rollers and gradually deepening the grooves as they progress spirally toward the ends of the rollers. This slight crown on the drive rollers, in particular, serve to influence a better belt centering action to wire belting.

It is another object to provide such spiralled ribbing with undulations such as recesses and/or a wave form coordinated with the spacing of the transverse cross wires in the woven wire belting so as to extend into the latter to afford a positive traction between such ribbing and the belting.

It is yet another object to set the spiralled ribbing on the rollers at a pitch conforming substantially with the pitch of the coil links of the belting to thereby assure against sidewise slippage of the belting relative to the rollers.

Still another object of this invention entails the provision of an annular row of radially projecting pins at the midwidth center of the rollers such that the pins engage toothlike into voids in the woven wire belting to maintain the latter centered widthwise on the rollers. In this connection the annular row of pins are preferably spaced circumferentially such as to extend into voids between the transverse cross wires of the particular size of belting to be driven by such rollers to afford a driving action if required.

Another object of this invention is the provision of a mounting ring for the annular row of radially projecting belt centering pins and setting of such ring into an annular groove in the roller for free turning relative thereto. This affords a self adjusting feature whereby the pins tend to find the voids in the woven wire belting as they come together on the conveyer system.

These and other objects and advantages of the present invention will become apparent from a reading of the following description in the light of the two sheets of accompanying drawing in which:

FIGS. 1 and 2 comprise a longitudinal section through a wire belt conveyer, FIG. 1 being the drive roller end and FIG. 2 being the return or terminal roller end of the conveyer;

FIG. 3 is a section through the belt of FIG. 2 taken substantially along line 3—3 therein, the terminal roller being in elevation;

FIG. 4 is a section through FIG. 1 taken along line 4—4 therein;

FIG. 5 is an illustration of a portion of woven wire belting in relation to a portion of the belt engaging surface of a roller periphery laid out flat;

FIG. 6 is a fragmentary section through a portion of wire belt and roller periphery;

FIG. 7 is a view similar to that of FIG. 6 showing a different form of beading on the roller surface;

FIG. 8 is a fragmentary section midway the ends of a roller showing one form of slip ring therefor;

FIG. 9 is a section through the slip ring and roller of FIG. 8 and taken along line 9—9 therein;

FIG. 10 is a fragmentary section similar to that of FIG. 8 showing a single form of slip ring on the roller;

FIG. 11 is an enlarged plan view of a portion of woven wire belting adapted for use on the rollers of the present invention.

GENERAL DESCRIPTION

Referring to FIGS. 1 and 2 of the drawings, a conveyer 15 is shown to include a closed loop system of woven wire belting 16 trained around at least two rollers, one 17 a drive roller for pulling the load and the other 18 at the terminal end of the conveyer. Idler rollers of like construction may be provided in between for supporting the load bearing reach of the woven wire belting.

In order to have an understanding of the present invention, a portion of woven wire belting 16 is shown in FIG. 11 to disclose the characteristics of this well known form of industrial belting. The most common form which is illustrated in FIG. 11 is known as balanced spiral (BS).

Balanced spiral belting consists of oppositely wound spiralled coils of wire L and R flattened and joined by cross rods x facilitating hinged action between coils. In this form, coil sizes may vary as may wire gauges dependent upon the loads to be carried and/or temperatures to be endured. In addition to the foregoing there are differences in basic weave leaving a net opening "O" in areas between the flat spiral coils of wire. The net opening "O" equals the distance from center to center of the wires L and R minus the gauge of wire used. As best seen in FIG. 11 the openings per foot of length are determined by the number of cross rods hinges x within each foot of length. The number of openings per foot of width is determined from the point of linkage of each convolute of coil L or R with a cross rod x. Thus it will noted that the pitch of each convolute of the spiralled coils L and R is dependent upon the size and mesh of the particular wire belting to be used.

While the selection of belting in accordance with the net size of the openings "O" therein is made to satisfactorily support the particular articles to be conveyed, it also has a bearing upon the pitch of spiralled ribbing to be provided on the drive, terminal and/or idler rollers in accordance with the present invention. In other words, the pitch of either convolute L or R has a direct bearing on the pitch of the ribbing on the rollers.

DETAILED DESCRIPTION OF THE INVENTION

Referring to the drawings each of the rollers 17 and 18 is provided with spiralled ribbing 20 in a manner as shown, described and claimed in my U.S. Pat. No. 3,713,348 which issued 1/30/1973 from application Ser. No. 183,808, filed Sept. 27, 1971. Briefly each roller 17–18 consists of a cylindrical surface or periphery 21 having grooves 22 formed therein spirally to receive the spiral ribbing. Each type of roller 17 and 18 is provided with a central groove 51 formed in its periphery equidistant from its ends. The spiralled grooves 22 are formed in the balance of the periphery 21 and are oppositely tending relative to each other at a pitch coordinated with the spiralled coils L and R of the belting 16. In the case of the drive roller 17 the grooves are formed such that the ribbing 20 is spirally tending, screw fashion, outwardly from center to apply a spreading action against the belting 16 from its longitudinal center outwardly. In the case of the terminal or idler rollers 18 the grooves are cut so as to support the ribbing 20 in an inwardly tending action to urge the belting widthwise toward longitudinal center.

The woven wire belting 16 actually rides upon the spiralled ribbing as distinguished from the peripheral surface 21 of the roller. The grooves 22 for supporting the beading 20 may be gradually deepened from center toward the ends of the peripheral surface 21 of each roller 17 and 18 to achieve a tapered projection of the convolutes from center outwardly. In this manner the spiralled beading 20 more firmly engages the belting 16 near the center and less so toward the ends of the rollers to achieve a tapered roller effect.

In accordance with the present invention, the spiralled beading 20 on the rollers has its convolutes set at a pitch coordinated with the pitch of the spiralled coils L and R of the balanced spiral belting to be trained about such rollers. By such arrangement the spiralled ribbing 20 of either roller 17 or 18 will register substantially with the net openings "O" in the areas between the spiralled coils L and R of the wire belting 16. This is depicted in FIG. 5 wherein the full circumferencial surface 21 of a roller is shown laid out flat with only one half (180°) of such surface 21 engaged by the wire belting 16 as normally seen in FIGS. 1, 2, and 9.

In combination with this feature of pitch coordination between the belting and ribbing 20, the ribbing may be wave formed in accordance with that of my aforementioned Copending application, Ser. No. 183,808. The ribbing 20 may be provided with serrations S as shown in FIG. 7 or the wire ribbing 20 may be formed with outwardly offset zones 20' as in FIG. 6 by a knurling process.

In either case, the wave form 20W, serrations 20S or offset zones 20' on the wire beading 20 is such as to project and fit between the cross rods x of the particular basic weave of the spiralled wire belting to be associated therewith. Moreover, in use of either the wave form 20W; the serrated beading 20S or the in and out offset portions 20' of the knurled type of ribbing, the outwardly projecting portions thereof are spaced lineally the circumference of the rollers so as to project between every other spacing between cross rods x and to fit into a net opening "O" facing the woven wire belting 16. This is depicted clearly in FIG. 11 showing an offset projection 20' disposed in one of the net openings "O of flattened coil R of the wire belting 16. As depicted in FIG. 7 it will be noted every other convolute thus finds seating in one or another set of these recesses (serrations) S to achieve a positive driving relation between the ribbing 20S and the woven wire belting 16.

By the foregoing arrangement of wire belting of normal width when trained about rollers with not too great a reach between their centers is maintained in centered relation to such rollers by the influence of the spiralled ribbing. The outward projections 20W, 20', etc. on the ribbing further enhances positive traction between such rollers and belting. However, on belting having its work supporting reach spanning between rollers spaced at longer distances apart and where there is additional weight to be considered, belt centering pins 50 are provided on such rollers 17 and 18 as illustrated in FIGS. 8, 9, and 10. It will be noted in FIGS. 3 and 4 that the rollers 17 and 18 are each normally provided with a groove 51 midway between their ends. The groove provides a seat for a ring 52 which fits the groove 51 (FIGS. 8, 9, and 10). The pins 50 are mounted on such ring 52 to extend radially therefrom as indicated in FIGS. 9 and 10. In accordance with the present invention the pins 50 are spaced circumferentially about the ring 52 so as to register with the openings "O" between cross rods x of the woven wire belting 16 to be applied thereto. By this arrangement the pins 50 will register with the centermost opening "O" along a centerline ¢ of the belting 16 as indicated in FIG. 11.

The pins 50 taper to a rounded, bullet nosed end 53 so as to achieve non-snagging entry into the openings "O" in the wire belting 16. For best results, the pins 50 extend into only about 50 to 70 percent of the thickness of the belting 16 so as not to extend completely through the belting. The pins 50 are therefore disposed to have driving engagement with one or another of the cross wires $x$ which are transverse to the direction of their movement with the belting 16.

In some installations where greater driving power may be required, the rings 52 can be welded to the rollers especially the drive roller 17 at the discharge end of the conveyer. In this manner, the pins 50 and fixed rings 52 serve to add driving force to the wire belting as well as for centering the latter on the rollers.

Where centering action between the pins 50 and the wire belting is the only consideration, the ring 52 may be free to turn within the groove 51 and about the roller 17 or 18. Thus regardless of discrepancies in the basic weave of the belting 16, the pins 50 will adjust to the openings "O" in the belting as the latter trains around the rollers.

As depicted in FIG. 8, the centering ring 52 may be of a width to support two or more annular rows of pins 50 as required. The annular rows of pins 50 on such ring 52C are spaced to coordinate with the spacing of the openings "O" adjacent to the normal centerline ₵ of the belting 16. In this manner a dual action afforded by the spaced annular rows of pins to assure against sidewise slippage of the belting relative to the rollers especially in the case of non-uniform or excessive loads transferred by the conveyer.

From the foregoing it will be appreciated that novel belt centering, aligning and traction is afforded for woven wire belting by rollers constructed in accordance with the present invention. While the belt centering, aligning and traction feature of these rollers have been described in specific detail, it should be understood that the same may be susceptible to variation, modification and/or alteration without departing from the spirit or scope of the invention therein as set forth in the appended claims.

What I claim as new and desire to protect by letters patent is:

1. A woven wire belting conveyer roller for use with belting of the type having alternately left and righthand spiralled coils of wire flattened and forming links between cross rod hinges gauged to form a balanced spiral mesh in which net opening voids between convolutes of the flattened spiralled coil links face the roller, the combination therewith of means for positively centering such belting relative to the rollers comprising:
   a cylindrical roller; and
   oppositely tending spiralled ribbing coiled about said cylindrical roller from widthwise center toward the ends thereof and coordinated with the size and pitch of the spiralled coils of the flattened spiralled coiled wire links of such balanced spiral mesh for projecting into the net opening voids thereof to prevent sidewise slippage of such woven wire belting relative to said cylindrical roller, said spiralled ribbing having a portion of its belt engaging periphery serrated to provide outwardly projecting portions in coordination with the gauge of the spacing of the cross rod hinges of the balanced spiral mesh of such woven wire belting for projecting into the net opening voids between convolutes of alternate ones of the flattened spiralled coiled links thereof.

2. A woven wire belting conveyer roller in accordance with that of claim 1 in which said cylindrical roller has spiralled grooves formed therein for receiving said spiralled ribbing.

3. A woven wire belting conveyer roller in accordance with that of claim 2 in which said spiralled grooves formed in said cylindrical rollers are shallowest adjacent midwidth center of said roller and of gradual increasing depth progressively toward the ends thereof whereby said spiralled ribbing tapers towards the ends of the roller to achieve a crown center effect and greater tension against the belting at center of the conveyer belt width.

4. A woven wire belting conveyer roller in accordance with that of claim 2 in which said spiralled ribbing has a wave form of in and out undulations coordinated with the gauge of the cross rod hinges of the balanced spiral mesh of such woven wire belting for projecting into the net opening voids between convolutes of the flattened spiralled coil links of such belting.

5. A woven wire belting conveyer roller in accordance with that of claim 1 including an annular row of radially extending toothlike pins arranged at widthwise center of said cylindrical roller and spaced circumferentially in coordination with the gauge of the cross rod hinges of the woven wire belting for entering net opening voids between the cross rod hinges and the convolutes of the flattened spiralled coiled links of the belting.

6. A woven wire belting conveyer roller in accordance with that of claim 5 including:
   a. an annular groove formed in said cylindrical roller midway the ends thereof;
   b. an annular ring mounted in the annular groove formed in said roller; and
   c. an annular row of tooth-like pins mounted on said annular ring in spaced circumferential relation in coordination with the gauge of the cross rod hinges between the flattened spiralled coiled links of such belting for entering net opening of voids therebetween.

7. A woven wire belting conveyer roller in accordance with that of claim 6 in which said annular ring is freely turnable within the groove formed in said cylindrical roller such that said pins on said annular ring adjust to the net opening voids in the flattened spiralled coiled links of such belting.

8. A woven wire belting conveyor roller in accordance with that of claim 7 in which said tooth-like pins terminate in a rounded bullet nosed end a distance from said annular ring substantially within the inner and outer limits of the flattened spiralled coil links of such belting.

9. A woven wire belting conveyer roller in accordance with that of claim 1 including an annular row of radially extending tooth-like pins arranged between the ends of said cylindrical roller and spaced circumferentially in coordination with the gauge of the cross rod hinges of the woven wire belting for entering the net opening voids between the cross rod hinges and the convolutes of the flattened spiralled coiled links of the belting.

10. A woven wire belting conveyer roller for use with belting of the type having alternately left and righthand spiralled coils of wire flattened and forming links between cross rod hinges gauged to form a balanced spiral mesh in which net opening voids between convolutes of the flattened spiralled coil links face the roller, the combination therewith of means for positively centering such belting relative to the rollers comprising:
- a cylindrical roller;
- oppositely tending spiralled ribbing coiled about said cylindrical roller from widthwise center toward the ends thereof and coordinated with the size and pitch of the spiralled coils of the flattened spiralled coiled wire links of such balanced spiral mesh for projecting into the net opening voids thereof to prevent sidewise slippage of such woven wire belting relative to said cylindrical roller;
- an annular groove formed in said cylindrical roller midway the ends thereof;
- an annular ring mounted in the annular groove formed in said roller; and
- an annular row of tooth-like pins mounted on said annular ring in spaced circumferential relation in coordination with the gauge of the cross rod hinges between the flattened spiralled coiled links of such belting for entering net opening voids therebetween.

11. A woven belting conveyer roller in accordance with that of claim 10 in which said annular ring is freely turnable within the groove formed in said cylindrical roller such that said pins on said annular ring adjust to one or another of the net opening voids in the flattened spiralled coiled links of such belting.

12. A woven wire belting conveyer roller in accordance with that of claim 11 in which said tooth-like pins terminate in a rounded bullet nosed end a distance from said annular ring substantially within the inner and outer limits of the flattened spiralled coil links of such belting.

13. A woven wire belting conveyer roller for use with belting of the type having alternately left and righthand spiralled coils of wire flattened and forming links between cross rod hinges gauged to form a balanced spiral mesh in which net opening voids between convolutes of the flattened spiralled coiled links face the roller, the combination therewith of means for positively centering such belting relative to the rollers comprising:
a. a cylindrical roller; and
b. an annular row of radially extending tooth-like pins arranged at widthwise center of said cylindrical roller and spaced circumferentially in coordination with the gauge of the cross rod hinges of the woven wire belting for entering net opening voids between such cross rods and the convolutes of the flattened spiralled coiled links of the belting.

14. A woven wire belting conveyer roller in accordance with that of claim 13 including:
a. an annular groove formed in said cylindrical roller between the ends thereof; and
b. an annular ring mounted for free rotation in said annular groove formed in said roller and supporting said annular row of tooth-like pins for adjustably entering one or another of the voids in the flattened spiralled coiled links of the belting for maintaining the belting centered relative to said roller.

15. A woven wire belting conveyer roller in accordance with that of claim 14 in which said tooth-like pins terminate in a rounded bullet nosed end a distance from said annular ring substantially within the inner and outer limits of the flattened spiralled coil links of such belting.

* * * * *